Aug. 1, 1967     N. P. REEFF     3,333,460
SEISMOMETER
Filed Feb. 25, 1964     3 Sheets-Sheet 1
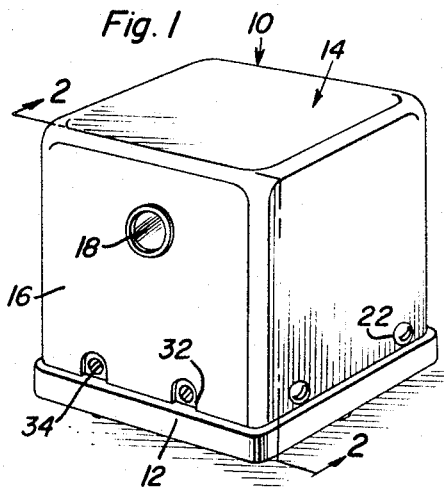
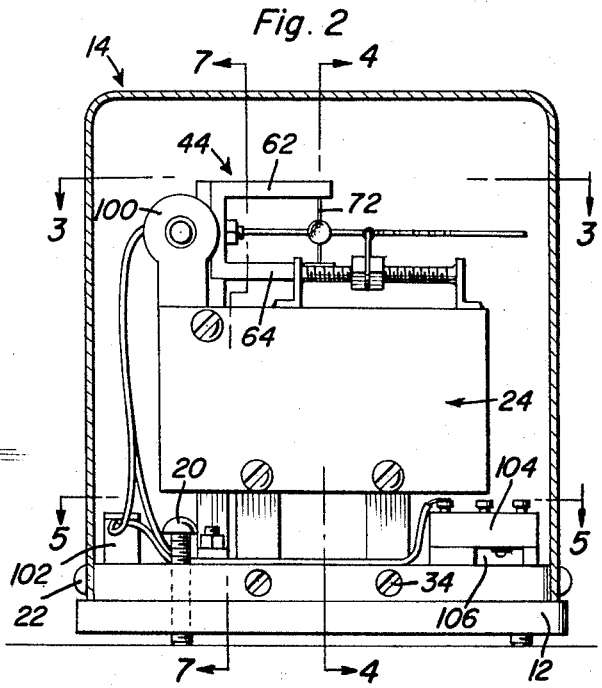
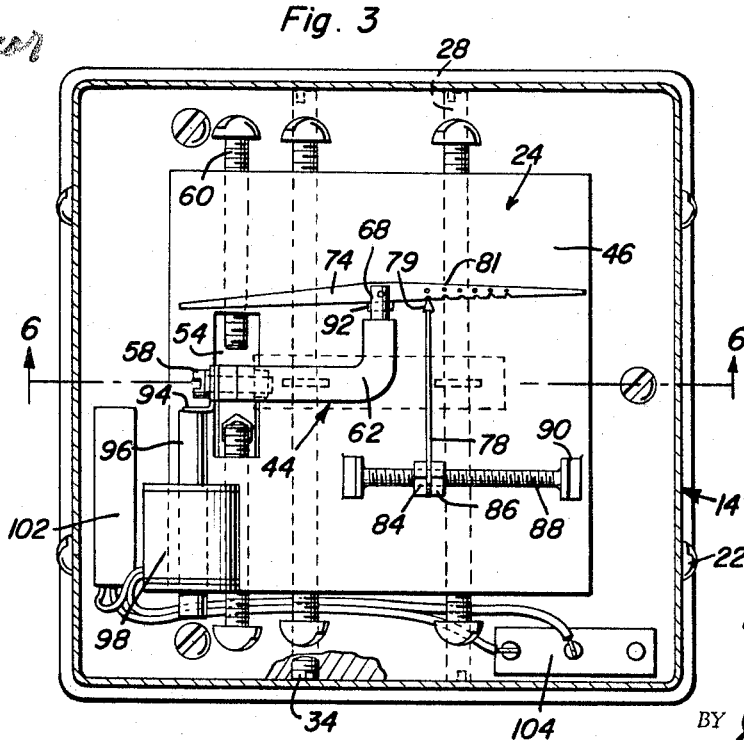
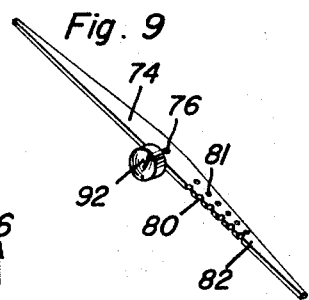
Nicholas P. Reeff
INVENTOR.

Aug. 1, 1967  N. P. REEFF  3,333,460
SEISMOMETER

Filed Feb. 25, 1964  3 Sheets-Sheet 2

Nicholas P. Reeff
INVENTOR.

BY *Clarence A. O'Brien*
*and Harvey B. Jacobson*
Attorneys

Aug. 1, 1967 N. P. REEFF 3,333,460
SEISMOMETER
Filed Feb. 25, 1964 3 Sheets-Sheet 3
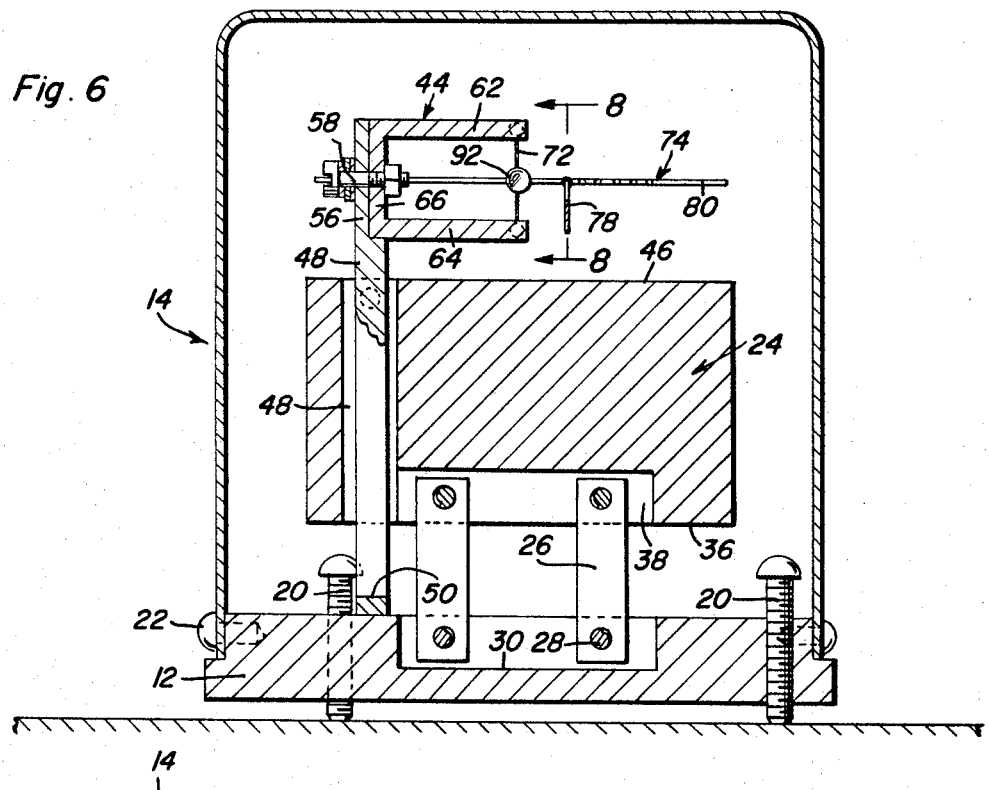
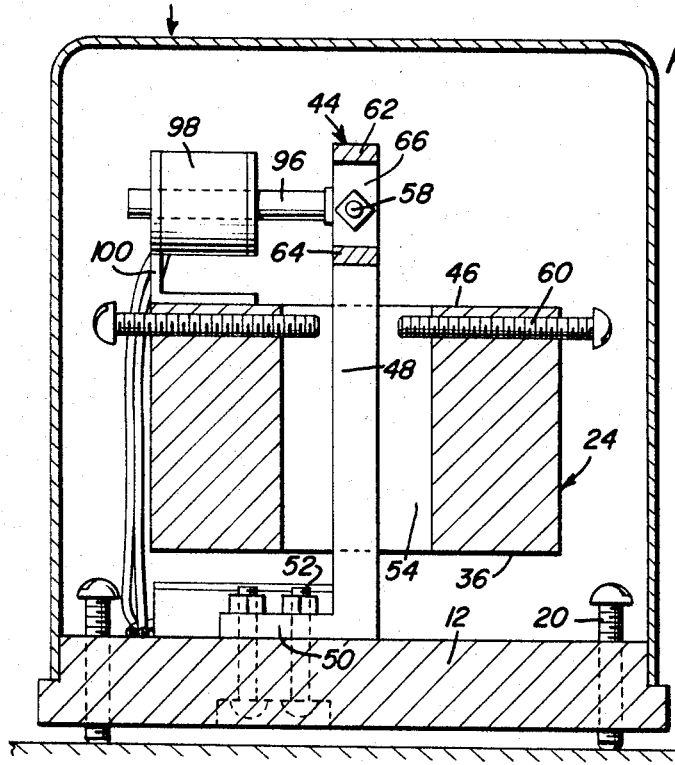
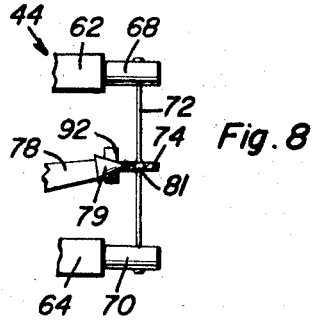
Nicholas P. Reeff
INVENTOR.

United States Patent Office 3,333,460
Patented Aug. 1, 1967

3,333,460
SEISMOMETER
Nicholas P. Reeff, 800 California St. SE.,
Albuquerque, N. Mex. 87108
Filed Feb. 25, 1964, Ser. No. 347,288
8 Claims. (Cl. 73—71.3)

This invention relates to a new and useful instrument for sensing and indicating all types of seismic events as well as vibrations or disturbances of man made origin.

An important object of the present invention, is to provide a seismometer or displacement sensing device that is relatively small in weight and dimension and also adjustable for a wide range of magnification ratios whereby the device is capable of recording vibrations or disturbances originating at either remote locations or locally. The device is therefore also particularly suited for teleseismic monitoring purposes.

In accordance with the foregoing object, the displacement sensing device of the present invention is rendered particularly sensitive despite its small size and weight by use of an inverted pendulum arrangement uniquely coupled to a motion recording linkage whereby low level energy waves are not lost by friction or in pivotal bearings.

Also in accordance with the foregoing objects, the displacement sensing device of the present invention, involves a linkage arrangement for converting the vibratory movement of the inverted pendulum at an adjustable ratio into an output motion to be optically recorded. The instrument is thereby rendered operative for sensing displacement communicated to the base of the instrument at a wide range of magnification.

As an additional object of the present invention, the displacement sensing device is provided with an electrical damping arrangement through which the instrument may be readily and accurately calibrated.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of one typical embodiment of the present invention.

FIGURE 2 is a front sectional view taken substantially through a plane indicated by section line 2—2 in FIGURE 1.

FIGURE 3 is a top sectional view taken substantially through a plane indicated by section line 3—3 in FIGURE 2.

FIGURE 6 is a sectional view taken substantially through a plane indicated by section line 6—6 in FIGURE 3.

FIGURE 7 is a sectional view taken substantially through a plane indicated by section line 7—7 in FIGURE 2.

FIGURE 8 is a partial sectional view taken substantially through a plane indicated by section line 8—8 in FIGURE 6.

FIGURE 9 is a perspective view of a part of the instrument of the present invention.

Figure 4:
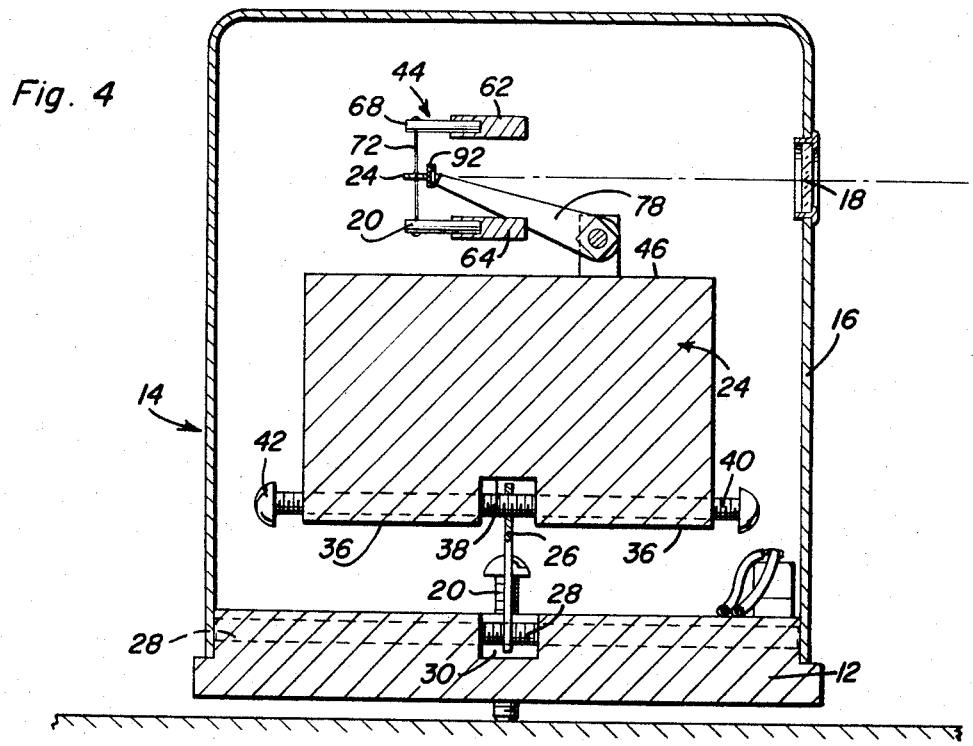
FIGURE 4 is a sectional view taken substantially through a plane indicated by section line 4—4 in FIGURE 2.
Figure 5:
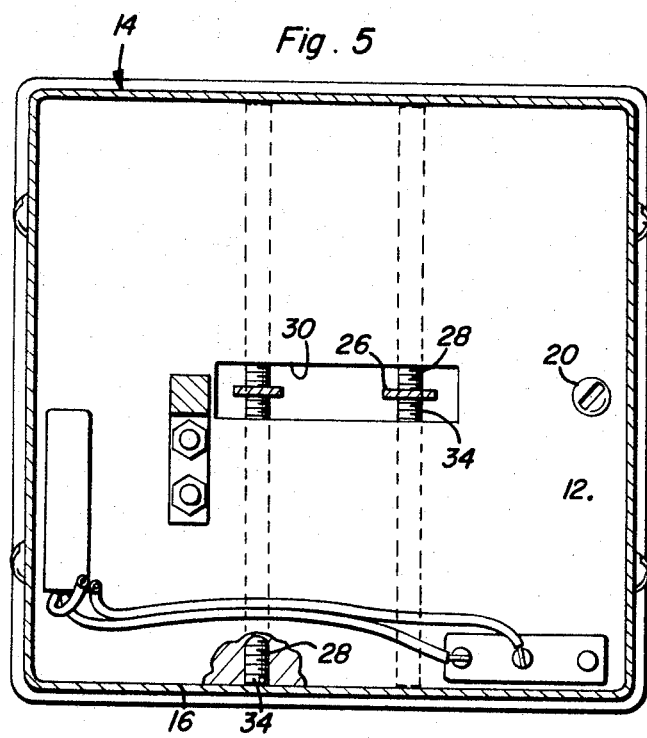
FIGURE 5 is a sectional view taken substantially through a plane indicated by section line 5—5 in FIGURE 2.

Referring now to the drawings in detail, it will be observed that the instrument of the present invention generally referred to by reference numeral 10 is provided with a base 12 made of a rigid material and supported on a horizontal surface through which vibrations or earth disturbances are communicated to the instrument. The displacement sensing components of the instrument are therefore mounted on the base 12 enclosed by any suitable housing 14, the front face 16 of which is provided with an opening in which a lens element 18 may be mounted. Optical recording facilities (not shown) of well known construction and operation is therefore employed to receive indications of displacements sensed by the instrument 10.

Referring now to FIGURES 2, 4, 6 and 7, it will be observed that the base 12 is provided with at least three leveling screw members 20 which extend vertically through internally threaded bores in the base 12 so as to adjustably space the base above the surface on which it is supported. The base 12 may thereby be adjusted to a horizontal position before the housing 14 is secured thereto by the plurality of fasteners 22.

Supported in spaced relation above the horizontally adjusted base 12 within the housing 14, is a pendulum or inertia mass 24. The mass 24 is supported above the base by an inverted pendulum suspension consisting of a pair of elastically flexible spring elements 26 preferably made of steel. As more clearly seen in FIGURES 4 and 6, the flexible supporting elements 26 are spaced from each other in a common plane passing through the elements in their unflexed condition so as to accommodate horizontal vibration of the pendulum mass 24 adjustably spaced above the supporting surface with a natural period of vibration between a fraction of a second and 2.5 seconds. The lower end portions of the flexible spring elements are respectively anchored to the base 12 by means of elongated screw members 28 which extend through a recess 30 formed in the base 12 for receiving the lower end portions of the spring elements 26. The adjustment screw members 28 are exposed through slots 32 formed adjacent the lower edges of the housing 14 and are provided with slotted adjustment heads 34 by means of which the lower anchored ends of the flexible spring elements 26 may be adjustably positioned within the recess 30 for balanced support of the pendulum mass 24. The bottom surface 36 of the pendulum mass is therefore provided with a recess 38 aligned with the recess 30 of the base so as to receive the upper end portions of the flexible spring elements 26. The upper end portions of the flexible spring elements are connected to the pendulum mass by means of a pair of screw members 40 which extend through the recess 38 and are also provided with adjustment heads 42 on opposite sides of the pendulum mass so that the position of the upper ends of the flexible spring elements may be adjusted within the recess 38. It will therefore be apparent, that the pendulum mass when installed in the instrument with the remaining parts connected thereto or engaged therewith, may be adjusted with respect to the flexible spring elements in order to support the pendulum mass in a statically balanced condition relative to the common plane of the elements while in an unflexed condition. The pendulum mass will then be in a highly sensitive state despite its relatively small size and weight capable of vibrating in response to remotely located seismic events because the adjusting screws 28 and 40 will permit static balancing of the mass avoiding the use of centering springs which would otherwise impair the sensitivity of the seismometer. Thus, the restoring force for the mass when vibrating is derived solely from the flexible spring elements 26. The pendulum mass being the heaviest component of the instrument will therefore enable construction of an instrument of relatively small weight and size. For example, an instrument weighing less than two pounds with the largest dimension being two and one-half inches, may be constructed in accordance with the present invention, utilizing the inverted pendulum arrangement thereof having a natural period of vibration of two and one-half seconds aforementioned.

The vibration of the pendulum mass produced in response to sensing of displacements, are mechanically reproduced and optically recorded at an adjustably varied ratio so that the instrument is capable of being used in connection with high, medium or low magnification purposes. Accordingly, the instrument may be useful for recording remote seismic events as well as local vibrations for teleseismic monitoring purposes. Toward this end, a pivot assembly generally referred to by reference numeral 44 is mounted by the base in spaced relation above the top surface 46 of the pendulum mass. The pivot assembly is supported by the base in its fixed position above the pendulum mass by means of a rigid post 48 having a lower flange portion 50 secured to the base by the fastener assemblies 52 and extending upwardly from the base through an elongated opening 54 in the pendulum mass as more clearly seen in FIGURE 7. The upper end portion 56 of the post is recessed for receiving the pivot assembly to which it is connected by the fastener bolt assembly 58 as more clearly seen in FIGURE 6. The opening 54 formed in the pendulum mass is large enough to accommodate vibratory movement of the pendulum mass relative to the rigid post 48, this arrangement being effective to render the instrument compact. The vibratory stroke of the pendulum mass may also be adjusted by means of a pair of limit screw members 60 threadedly received by the pendulum mass adjacent to the upper surface 46 thereof and projecting into the elongated opening 54 as more clearly seen in FIGURES 3 and 7.

The pivot assembly includes upper and lower projecting portions 62 and 64 interconnected by a connecting portion 66 through which the bolt assembly 58 extends for securing the pivot assembly to the upper end portion 56 of the post. Projecting from the right angle ends of the upper and lower portions 62 and 64 are a pair of pins 68 and 70 anchoring the ends of a vertical torsion wire 72 by means of which an output lever member 74 is pivotally mounted for displacement in a horizontal plane spaced above the top surface 46 of the pendulum mass. The torsion wire 72 is therefore rigidly secured to a central portion 76 of the lever member tending to hold the lever member in a centered position from which it is displaced in response to vibratory movement of the pendulum mass. The lever member is preferably made of a flat lightweight material such as aluminum and displacement thereof is effected by means of a displacing element 78 having a small permanent magnet 79 at one end engageable in one of a plurality of spaced notches 80 formed in a front edge 82 of the lever member on one side of the central portion 76 to which the torsion wire 72 is connected. Located adjacent each notch 80 is a pinpoint of soft iron material 81, arranged to cause the lever member 74 to more faithfully follow any large excursion of the displacing element 78 because of the magnetic coupling between the magnet 79 and the material 81. Pivotal displacement of the lever member 74 will be effected at a ratio depending upon the spacing of the displacing element 78 from the pivot assembly 44. The location of the displacing element 78 on the top surface 46 of the pendulum mass is therefore adjustable for this purpose. As more clearly seen in FIGURES 3 and 4, the displacing element is secured in adjusted position to the pendulum mass between a pair of nut elements 84 and 86 threadedly mounted on a screw shaft 88 secured between the projections 90 which extend upwardly from and are secured to the top surface 46 of the pendulum mass. Thus, vibratory movement of the pendulum mass will be imparted to the lever member 74 producing an output motion thereof which may be optically recorded. A reflecting lens element 92 is therefore secured to the forward edge 82 of the lever member adjacent the central portion 76 as more clearly seen in FIGURE 9 whereby light entering the housing 14 through the lens element 18 may be reflected with a varying reflection angle as will be apparent from FIGURE 4 in order to optically register the output motion of the lever member 74 on any suitable record (not shown) with which the seismometer may be associated.

Figure 10:
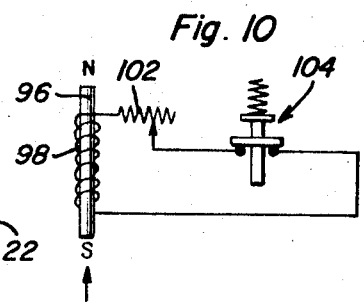
FIGURE 10 is an electrical circuit diagram associated with a portion of the instrument of the present invention.

In order to control the vibratory movement imparted to the pendulum mass when sensing vibrations or seismic disturbances, electrical damping facilities are provided. Referring to FIGURES 3 and 7 in particular, it will therefore be noted that the fastener bolt assembly 58 by means of which the pivot assembly 44 is secured to the upper portion 56 of the rigid post, also secures to the upper portion of the post on the opposite side thereof, a right angle bracket 94 to which a magnetized core 96 is secured at one axial end. Accordingly, the magnetic core 96 will be fixed with respect to the base 12. The magnetic core extends through an electrical coil assembly 98 fixedly mounted on the top surface 46 of the pendulum mass adjacent one corner by means of the bracket 100. The coil assembly 98 is electrically connected to an adjustable resistor 102 mounted on the base as more clearly seen in FIGURES 2 and 3 and to a normally closed switch assembly 104 also mounted on the base and adapted to be opened by insertion of a screwdriver for example within the slot 106 after removal of the housing 14. It will therefore be apparent with reference to FIGURE 10 that vibratory movement imparted to the coil assembly 98 by the pendulum mass relative to the core 96 will induce a voltage therein producing a flow of current in the circuit completed by the switch assembly 104 in its normally closed condition. The effect of such induced current flow is regulated by the adjustable resistance 102 to thereby impose a relatively small retarding force on the coil assembly 98 to dampen the vibrations of the pendulum mass. The dampening force may therefore be adjusted by the setting of the adjustable resistor 102. Also, by opening of the switch assembly 104 as hereinbefore mentioned, the electrical dampening action may be removed so as to permit free vibration of the pendulum mass for calibration purposes. For example, upon opening of switch 104, a known displacing force may be imparted to the pendulum mass by an electrical pulse applied from an external source to the coil assembly 98.

From the foregoing description, the construction and operation and utility of the device of the present invention will be apparent. It will therefore be appreciated, that an instrument of extremely small weight and size capable of reproducing horizontal motion with variable magnification, is made possible. Such a miniaturized sensing instrument will therefore find utility in many different installations and in particular for teleseismic monitoring purposes. The instrument also avoids the instability and delicateness of electrical transducers, relying instead upon a mechanical and optical recording system reproducing vibratory movement imparted to the highly sensitive inverted pendulum arrangement through which displacements are sensed. Electrical facilities are only used for vibration damping purposes so as to avoid disturbing the sensitivity of the instrument. By changing the effective length of spring supports 26, the height of the inverted pendulum mass above the supporting surface through which vibrations are transmitted will also permit rapid variation of its natural period of vibration either separately or simultaneously with adjustment of the magnification ratio. Longer periods of 1.5 to 2.5 seconds will therefore be suitable for detecting distant earthquakes wherein the higher vibration frequencies are absorbed by rock structure. The shorter periods of 0.5 to 1.5 seconds on the other hand will be suitable for locally produced vibrations for detecting the higher frequencies. Further, because of the constructional ruggedness, economy and size and simplicity of adjustment, the seismometer will be suitable for educational purposes as well as effective for professional use.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a seismometer, a base, an inertia mass, elastically flexible means anchored to said base disposed substantially in a common plane intersecting the mass, said mass being connected solely to the flexible means in a statically balanced position above the base to vibrate in a direction transverse to said common plane, said flexible means comprising, a pair of flat spring elements having their flat faces aligned in the common plane, connected at opposite end portions to the base and the inertia mass, and means for adjustably positioning the said opposite end portions on the base and the inertia mass for supporting the inertia mass in said statically balanced position with the elements in an unflexed condition.

2. The combination of claim 1 including a post fixed to the base and extending upwardly therefrom through an opening formed in the inertia mass intersecting the common plane, and limit means mounted by the inertia mass projecting into said opening for engagement with the post to adjustably limit the vibratory stroke of the inertia mass.

3. The combination of claim 1 including dampening means operatively mounted on the base for controllably retarding vibration of the inertia mass, and means for selectively rendering the dampening means inoperative to permit calibration of the displacements sensed by free vibration of the inertia mass and the flexible means at the natural frequency.

4. The combination of claim 3 wherein said dampening means comprises, a post fixed to the base extending upwardly therefrom above the inertia mass, a magnetic core secured to said post in spaced relation to the inertia mass and coil means secured to the inertia means and receiving said core therethrough to magnetically retard relative movement between the post and the inertia mass.

5. In a seismometer, a base, an inertia mass, elastically flexible means anchored to said base and projecting upwardly therefrom, means for connecting the flexible means to the inertia mass in a balanced condition spaced above the base to vibrate in response to displacements communicated to the base, dampening means operatively mounted on the base for controllably retarding vibration of the inertia mass, means for selectively rendering the dampening means inoperative to permit calibration of the displacements sensed by free vibration of the inertia mass and the flexible means at the natural frequency, said dampening means comprising a post fixed to the base extending upwardly therefrom above the inertia mass, a magnetic core secured to said post in spaced relation to the inertia mass and coil means secured to the inertia mass and receiving said core therethrough to magnetically retard relative movement between the post and the inertia mass, and adjustable means operatively connected to the post and the inertia mass for reproducing the vibrations thereof at high and low magnification comprising, a torsion wire pivot assembly mounted on the post above the inertia mass, a lever means mounted by said pivot assembly for displacement in a horizontal plane, displacing means mounted in adjusted positions on the inertia means for engagement with the lever means at spaced locations from the pivot assembly, and optical means mounted on the lever means for registering displacement thereof.

6. In a seismometer, a base, an inertia mass, elastically flexible means anchored to said base and projecting upwardly therefrom, means for connecting the flexible means to the inertia mass in a balanced condition spaced above the base to vibrate in response to displacements communicated to the base, a torsion wire pivot assembly, mounting means secured to the base for supporting the pivot assembly above the inertia mass, a lever means mounted by said pivot assembly for displacement in a horizontal plane, displacing means mounted in adjusted positions on the inertia means for engagement with the lever means at spaced locations from the pivot assembly, and optical means mounted on the lever means for registering displacement thereof.

7. The combination of claim 6 wherein said post extends through an opening formed in the inertia mass, and limit means mounted by the inertia mass projecting into said opening for engagement with the post to adjustably limit the vibratory stroke of the inertia mass.

8. In a vibration sensing device, a base, a pendulum mass, elastic means mounted on the base for supporting the pendulum mass spaced thereabove in a statically balanced condition relative to a plane intersecting the mass, movement reproducing means mounted by the base for converting vibrations of the pendulum mass into output motion at an adjustable ratio, means for electrically dampening vibration of the pendulum mass without unbalancing thereof, and means for optically registering said output motion of the movement reproducing means, said elastic means comprising, a pair of flat spring elements with their flat faces substantially disposed in said common plane and connected at opposite end portions to the base and the pendulum mass, and means for adjustably positioning the said opposite end portions on the base and the pendulum mass respectively for balanced support of the pendulum mass only by the elements in an unflexed condition.

References Cited

UNITED STATES PATENTS

| | | | |
|---|---|---|---|
| 1,727,991 | 9/1929 | Kimball | 73—71.1 |
| 2,067,636 | 1/1937 | Heiland | 340—17 |
| 2,136,759 | 10/1938 | Ryan | 73—71.1 |
| 2,263,295 | 10/1941 | Greentree | 73—71.7 X |
| 2,739,297 | 3/1956 | Atanasoff et al. | 340—17 |
| 2,873,103 | 2/1959 | Hautly | 73—71 |
| 2,883,176 | 4/1959 | Bernstein | 73—71.2 X |
| 3,194,060 | 7/1965 | Greenwood | 73—71.2 |

OTHER REFERENCES

Harris & Grede, Shock and Vibration Handbook, volume 1, McGraw-Hill, N.Y., 1961, TA355 H35 C.2, pp. 8–10, 14–18.

JAMES J. GILL, *Acting Primary Examiner.*

J. P. BEAUCHAMP, *Assistant Examiner.*